United States Patent
Jingu

(10) Patent No.: US 11,465,074 B2
(45) Date of Patent: Oct. 11, 2022

(54) DEGASSING DEVICE

(71) Applicant: Shimadzu Corporation, Kyoto (JP)

(72) Inventor: Kumiko Jingu, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 211 days.

(21) Appl. No.: 16/648,963

(22) PCT Filed: Jun. 21, 2018

(86) PCT No.: PCT/JP2018/023551
§ 371 (c)(1),
(2) Date: Mar. 19, 2020

(87) PCT Pub. No.: WO2019/077802
PCT Pub. Date: Apr. 25, 2019

(65) Prior Publication Data
US 2020/0282337 A1    Sep. 10, 2020

(30) Foreign Application Priority Data
Oct. 20, 2017    (JP) .............................. JP2017-203635

(51) Int. Cl.
*B01D 19/00*    (2006.01)
*B01D 15/16*    (2006.01)
(Continued)

(52) U.S. Cl.
CPC ....... *B01D 19/0036* (2013.01); *B01D 15/166* (2013.01); *B01D 19/0031* (2013.01);
(Continued)

(58) Field of Classification Search
CPC ......... B01D 19/00; B01D 15/16; G01N 15/16
See application file for complete search history.

(56) References Cited

U.S. PATENT DOCUMENTS

| | | | | |
|---|---|---|---|---|
| 5,205,844 A | * | 4/1993 | Morikawa | .......... B01D 19/0063 96/6 |
| 8,495,906 B2 | * | 7/2013 | Sugiyama | .......... B01D 19/0036 73/53.01 |
| 10,041,914 B1 | * | 8/2018 | Jingu | .................... G01N 30/74 |

FOREIGN PATENT DOCUMENTS

| | | |
|---|---|---|
| JP | 4-110656 A | 4/1992 |
| JP | 2012-161723 A | 8/2012 |

OTHER PUBLICATIONS

Office Action from the Japanese Patent Office for corresponding Japanese patent application No. JP 2019-549110, dated Dec. 8, 2020, submitted with a machine translation.
(Continued)

*Primary Examiner* — Youngsul Jeong
(74) *Attorney, Agent, or Firm* — Muir Patent Law, PLLC

(57) ABSTRACT

The degassing device includes a degassing flow path, a vacuum chamber, a vacuum pump, an inlet flow path, an outlet flow path, a drain flow path, a downstream side switching unit, and a controller. The degassing flow path is made of a gas-permeable, liquid-impermeable tube, and is accommodated in the vacuum chamber. The inlet flow path is for introducing a mobile phase to the degassing flow path, and the outlet flow path is for causing a mobile phase which has passed through the degassing flow path to flow out. The drain flow path is provided separately from the outlet flow path and is configured to drain the mobile phase in the degassing flow path from the degassing flow path. The downstream side switching unit is configured to switch the downstream end of the degassing flow path so as to be connected to either the outlet flow path or the drain flow path. The controller controls the operation of the downstream side switching unit, and is configured to connect the downstream end of the degassing flow path to the drain flow path at a predetermined timing when feeding of the mobile (Continued)

phase by the liquid feeding pump is stopped to drain the mobile phase in the degassing flow path through the drain flow path.

6 Claims, 12 Drawing Sheets

(51) Int. Cl.
G01N 30/34 (2006.01)
G01N 30/02 (2006.01)

(52) U.S. Cl.
CPC ......... *B01D 19/0063* (2013.01); *G01N 30/34* (2013.01); *G01N 2030/027* (2013.01)

(56) References Cited

OTHER PUBLICATIONS

International Search Report for PCT application PCT/JP2018/023551 dated Sep. 11, 2018, submitted with a machine translation.

* cited by examiner

DEGASSING DEVICE

TECHNICAL FIELD

The present invention relates to a degassing device used for degassing a mobile phase fed in, an analytical flow path of, for example, a high-performance liquid chromatograph (hereinafter referred to as "HPLC").

BACKGROUND OF THE INVENTION

In an HPLC, it is known that dissolved oxygen and minute air bubbles contained in a mobile phase become causes of various problems, such as, e.g., defective liquid feeding and/or flow rate fluctuations of a liquid feeding pump, baseline fluctuations, noises, and/or a decrease in detection sensitivity of a detector. Therefore, it is commonly performed to arrange the degassing device on the upstream side of the liquid feeding pump on the distribution channel of the mobile phase to degas the mobile phase solvent by a degassing device (see Patent Document 1).

A degassing device is configured such that a degassing flow path made of a gas-permeable, liquid-impermeable tube is provided in a sealed space called a vacuum chamber to extract gas components from the liquid flowing through the degassing flow path by depressurizing the vacuum chamber with a vacuum pump and discharge them to the outside of the vacuum chamber (see Patent Document 2).

PRIOR ART DOCUMENT

Patent Document
Patent Document 1: Japanese Unexamined Patent Application Publication No. 2010-151671
Patent Document 2: Japanese Unexamined Patent Application Publication No. 2012-161723

SUMMARY OF THE INVENTION

Problems to be Solved by the Invention

In an HPLC, when a given analysis is completed, a liquid feeding pump stops, which in tun stops the flow of the mobile phase. This results in stagnation of the mobile phase in the degassing flow path of the degassing device. When this state is maintained for a long period of time without initiating the subsequent analysis, the mobile phase in the degassing flow path will evaporate and permeate the gas-permeable tube to be stayed in the vacuum chamber or in the vacuum pump. There are various solvents used as a mobile phase, and for example, a solvent having high solubility such as chloroform is used in a GPC (gel permeation chromatography) analysis. If such a solvent evaporates and stays in a vacuum chamber and/or a vacuum pump, components in the degassing device may be damaged. e.g., corroded or swollen.

Under the circumstances, it is an object of the present invention to prevent a vaporized mobile phase from staying in a degassing device.

Means for Solving the Problem

A degassing device according to the present invention is for degassing the mobile phase by being provided on a flow path of a mobile phase fed by a liquid feeding pump. The degassing device is provided with a degassing flow path, a vacuum chamber, a vacuum pump, an inlet flow path, an outlet flow path, a drain flow path, a downstream side switching unit, and a controller. The degassing flow path is made of a gas-permeable, liquid-impermeable tube and is accommodated in the vacuum chamber. The vacuum pump is connected to the vacuum chamber to reduce the pressure in the vacuum chamber. The inlet flow path is configured to introduce a mobile phase to the degassing flow path, and the outlet flow path is configured to cause the mobile phase which has passed through the degassing flow path to flow out. The drain flow path is provided separately from the outlet flow path to drain the mobile phase in the degassing flow path from the degassing flow path. The downstream side switching unit is configured to switch the downstream end of the degassing flow path so as to be connected to either the outlet flow path or the drain flow path. The controller is configured to control the operation of the downstream side switching unit so that the downstream end of the degassing flow path is connected to the drain flow path at a predetermined timing when feeding of the mobile phase by the liquid feeding pump is stopped to drain the mobile phase in the degassing flow path through the drain flow path.

In other words, the degassing device is configured to drain the mobile phase in the degassing flow path through the drain flow path at a predetermined timing when feeding of the mobile phase liquid by the liquid feeding pump is stopped, for example, when a series of scheduled analysis operations is completed. With this configuration, it becomes possible to prevent the mobile phase from staying in the degassing flow path for a long period of time.

The degassing device according to the present invention may further include an atmospheric open flow path having an upstream end opened to the atmosphere and an upstream side switching unit configured to switch the upstream end of the degassing flow path so as to be connected to either the inlet flow path or the atmospheric open flow path. In this case, the controller is configured to control the operation of the downstream side switching unit and the upstream side switching unit to connect the upstream end of the degassing flow path to the inlet flow path in a case where the downstream end of the degassing flow path is connected to the outlet flow path and to connect the upstream end of the degassing flow path to the atmospheric open flow path in a case where the downstream end of the degassing flow path is connected to the drain flow path. With this configuration, when the mobile phase in the degassing flow path is drained from the drain flow path, the inlet flow path leading to the mobile phase container in which the mobile phase is accommodated can be cut off from the degassing flow path, and only the mobile phase in the degassing flow path can be drained from the drain flow path. This allows the mobile phase in the mobile phase container to be stayed without being drained.

Further, the degassing device according to the present invention may further include a cleaning solution supply flow path configured to supply a cleaning solution to the degassing flow path and an upstream side switching unit configured to switch the upstream end of the degassing flow path so as to be connected to either the inlet flow path or the cleaning solution supply flow path. In this case, the controller is configured to control the operation of the downstream side switching unit and the upstream side switching unit to connect the upstream end of the degassing flow path to the inlet flow path in a case where the downstream end of the degassing flow path is connected to the outlet flow path and to connect the upstream end of the degassing flow path to the cleaning solution supply flow path in a case where the downstream end of the degassing flow path is connected to the drain flow path. With this configuration, when the mobile phase in the degassing flow path is drained through the drain flow path, the inlet flow path leading to the mobile phase container in which the mobile phase is accommodated can be shut off from the degassing flow path, and the cleaning solution can be flowed into the degassing flow path to clean the inside of the degassing flow path.

The controller may be configured to also control the operation of the vacuum pump to operate the vacuum pump for a predetermined period of time after the mobile phase in the degassing flow path has been drained through the drain flow path. With this configuration, after the mobile phase is drained from the degassing flow path, the mobile phase vaporized gases present in the vacuum chamber and the vacuum pump can be discharged to the outside.

In each of the above-described embodiments, it is assumed that a series of scheduled analyses has been completed and thereafter feeding of the mobile phase is not initiated for a certain period of time (one day or more particularly in the case of a highly corrosive solvent) although depending on a solvent, and is configured such that the mobile phase will not stay in the degassing flow path for such a long period of time. That is, the present invention is not intended to drain the mobile phase in the degassing flow path through the drain flow path each time a single analysis is completed. If a plurality of analyses is scheduled and the mobile phase in the degassing flow path is drained every time each analysis is completed, the mobile phase is wastefully consumed, resulting in increased naming costs.

On the other hand, if the vacuum pump is continuously driven when a predetermined period of time is required from completion of a certain analysis to initiation of a subsequent analysis although a plurality of analyses is scheduled, evaporation of the mobile phase in the degassing flow path will be promoted and drained. This results in wasteful consumption of the mobile phase. Therefore, it is preferably configured such that the controller also stops the operation of the vacuum pump in a case where feeding of the mobile phase by the liquid feeding pump is in a stopped state. This makes it possible to suppress the mobile phase from being consumed when feeding of the mobile phase by the liquid feeding pump is in a stopped state, that is, in a case where the analysis is not being performed.

In the above case, it may be configured such that the degassing device further includes a flow sensor configured to detect the flow rate of the mobile phase flowing through the outlet flow path, and the controller stops the operation of the vacuum pump in a case where the flow rate of the mobile phase detected by the flow sensor is zero. With this case, it is possible to automatically detect whether or not the liquid feeding pump is in operation by the flow sensor. It should be noted that the present invention is not limited to this, and the controller may determine whether or not the operation of the vacuum pump should be stopped upon receipt of a signal indicating whether or not the device is in operation from the liquid feeding pump.

Effects of the Invention

In the degassing device according to the present invention, since it is configured such that the mobile phase in the degassing flow path is drained through the drain flow path at a predetermined timing when feeding of the mobile phase by the liquid feeding pump is stopped, it is possible to prevent the mobile phase from staying in the degassing flow path for a long period of time, which in turn can suppress components in the degassing device from being corroded or swollen.

EMBODIMENTS FOR CARRYING OUT THE INVENTION

Figure 1:
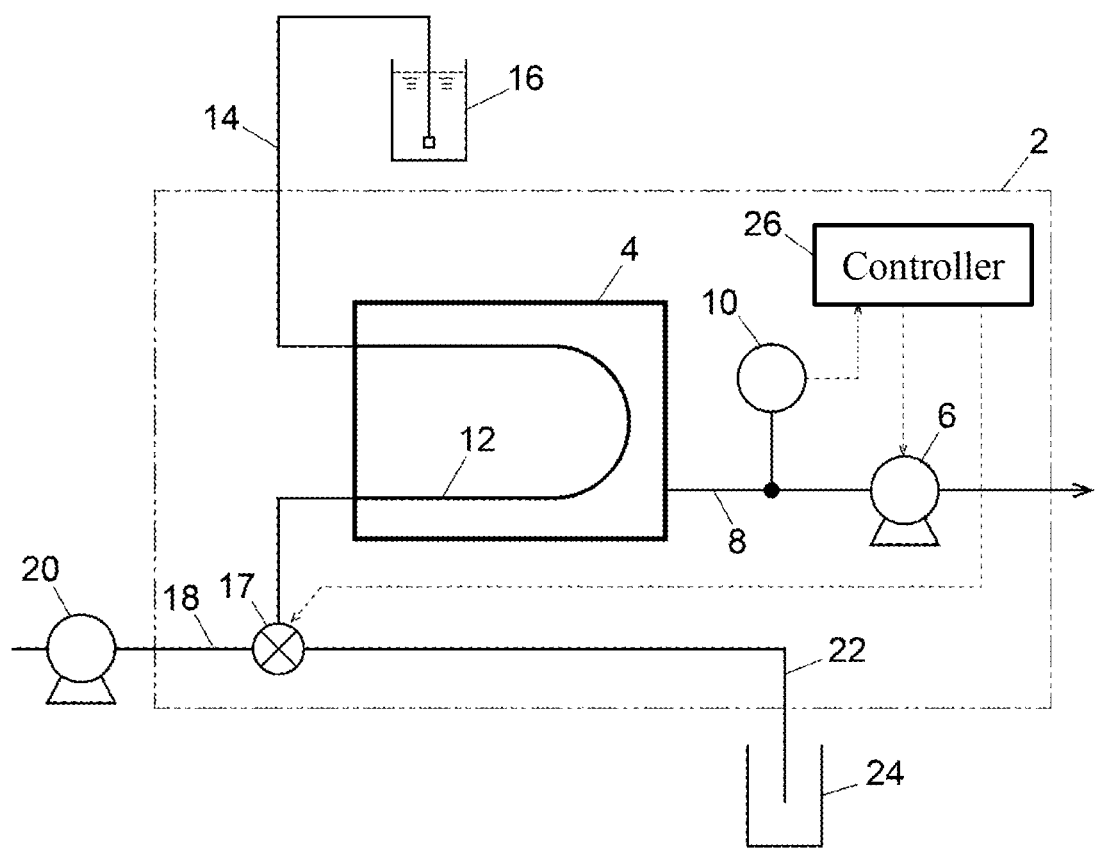
FIG. 1 is a flow path configuration diagram showing an embodiment of a degassing device.

Embodiments of this degassing device will be described below with reference to the attached drawings.

An example of the degassing device will be described with reference to FIG. 1.

The degassing device 2 of this embodiment is provided with, as main components, a vacuum chamber 4, a vacuum pump 6, a degassing flow path 12, a downstream side switching unit 17, and a controller 26. The vacuum chamber 4 has a sealed space therein, and a degassing flow path 12 is accommodated in the sealed space. The vacuum pump 6 is in fluid communication with the sealed space in the vacuum chamber 4 via a vacuum flow path 8, and the vacuum chamber 4 is configured to be decompressed by the vacuum pump 6. A pressure sensor 10 is provided for sensing the pressure in the vacuum flow path 8, and the detection signal of the pressure sensor 10 is received by the controller 26. The controller 26 is configured to perform the operation control of the vacuum pump 6 based on the detection signal of the pressure sensor 10 so that the pressure in the vacuum chamber 4 becomes preset pressure.

The degassing flow path 12 is a flow path made of a gas-permeable, liquid-impermeable tube. The upstream end of the degassing flow path 12 is in fluid communication with an inlet flow path 14 leading to a container 16 containing a mobile phase, and the downstream end of the degassing flow path 12 is connected to one of connecting ports of a downstream side switching unit 17.

The downstream side switching unit 17 is composed of a three-way solenoid valve having three connecting ports. An outlet flow path 18 and a drain flow path 22 are connected to the remaining two connecting ports of the downstream side switching unit 17. The downstream side switching unit 17 is configured to connect the downstream end of the degassing flow path 12 in fluid communication with one of the outlet flow path 18 and the drain flow path 22. The outlet flow path 18 is a flow path leading to a liquid feeding pump 20 for feeding a mobile phase. The drain flow path 22 is a flow path for draining the mobile phase in the degassing flow path 12 from the degassing flow path 12, and the downstream end thereof is communicated with a waste liquid bottle 24. The operation of the downstream side switching unit 17 is also controlled by the controller 26.

The controller 26 is realized by an arithmetic element such as a microcomputer and a predetermined program executed by the arithmetic element. The controller 26 is configured such that a signal is input to the controller 26 from an external device, such as, e.g., a system controller for controlling the entire system of an HPLC and that the operation of the downstream side switching unit 17 is controlled based on the signal.

Figure 2:
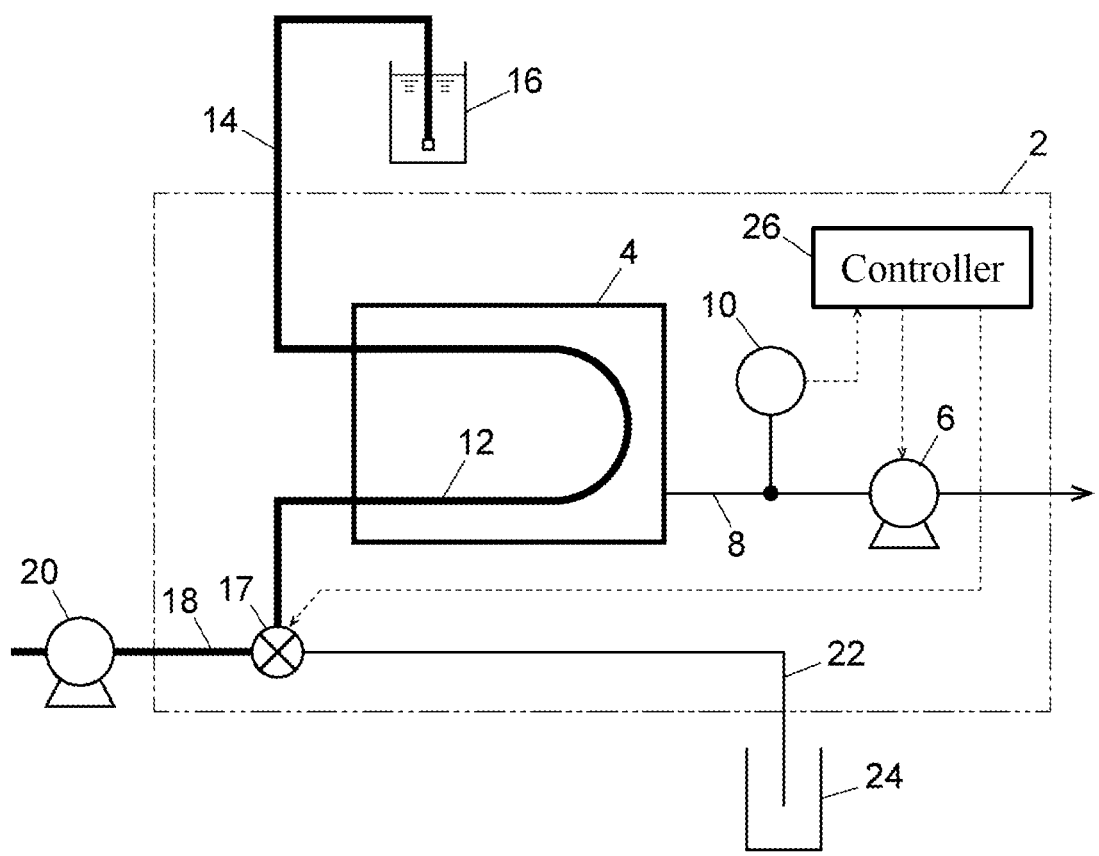
FIG. 2 is a flow path configuration diagram according to the embodiment in which a mobile phase liquid feeding path is indicated by a thick line.

Specifically, at the time of the analysis by an HPLC, the controller 26 sets the downstream side switching unit 17 to a state in which the downstream end of the degassing flow path 12 is connected to the outlet flow path 18. This causes the mobile phase of the mobile phase container 16 to flow through the degassing flow path 12 to the outlet flow path 18 as shown in FIG. 2.

Figure 3:
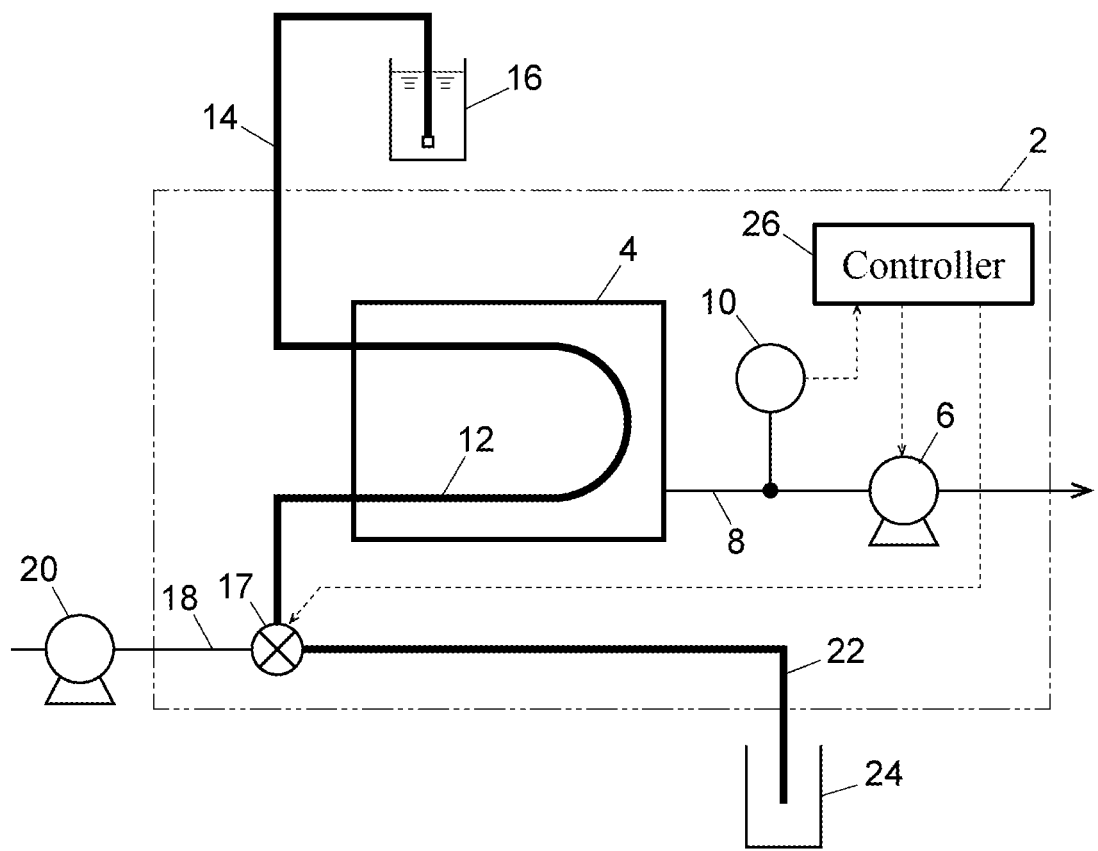
FIG. 3 is a flow path configuration diagram according to the embodiment in which a mobile phase liquid discharging path is indicated by a thick line.

At a predetermined timing when feeding of the mobile phase liquid by the liquid feeding pump 20 is stopped, for example, when a series of analytical operations is completed, the controller 26 sets the downstream side switching unit 17 to a state in which the downstream end of the degassing flow path 12 and the drain flow path 22 are connected. The downstream end of the drain flow path 22 is arranged at a position lower than the downstream end of the mobile phase container 16 and the degassing flow path 12. When the downstream end of the degassing flow path 12 is connected to the drain flow path 22, the mobile phase in the degassing flow path 12 and the mobile phase container 16 is drained through the drain flow path 22 to the waste liquid bottle 24, as shown in FIG. 3. This prevents a mobile phase from staying in, the degassing flow path 12 for a long period of time after completion of a series of analysis operations.

Figure 4:
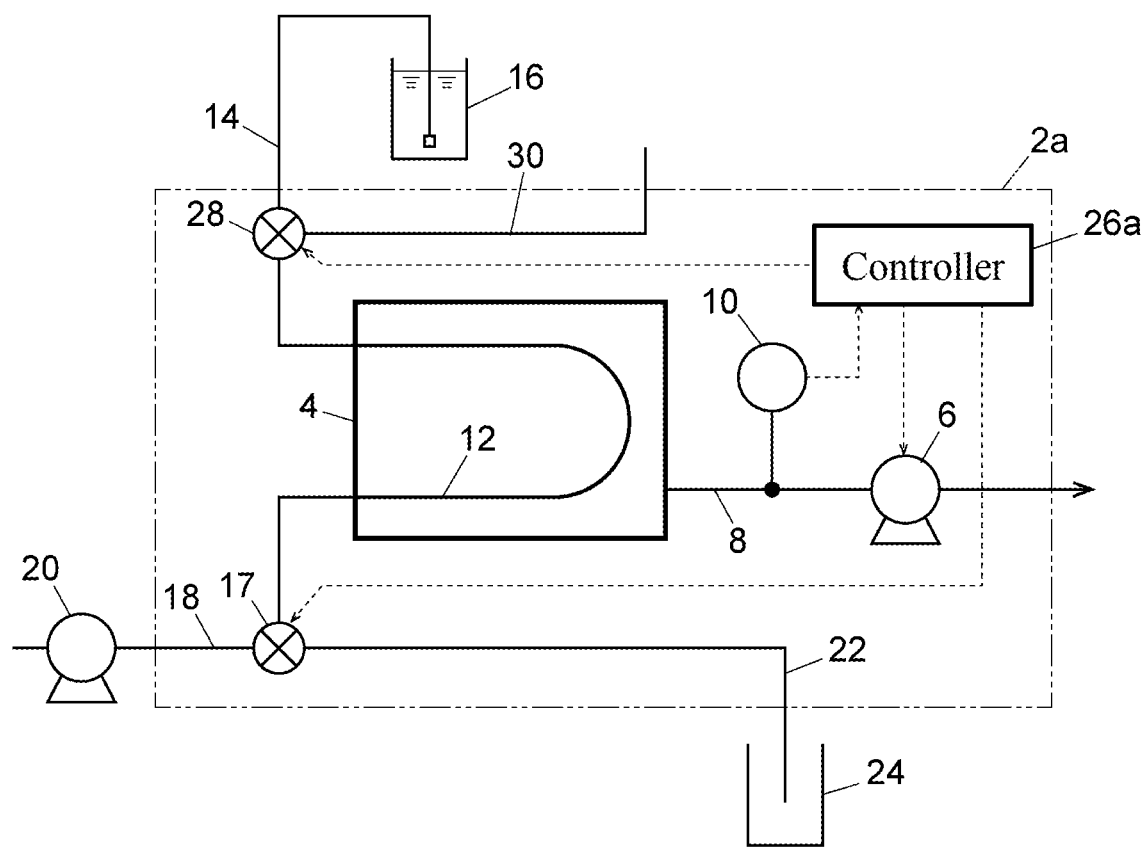
FIG. 4 is a flow path configuration diagram of a degassing device according to another embodiment.

FIG. 4 shows another embodiment of a degassing device.

In addition to the configuration of the degassing device 2 of FIG. 1, the degassing device 2a of this embodiment is provided with an atmospheric open flow path 30 whose upstream end is open to the atmosphere, and is configured to selectively connect the upstream end of the degassing flow path 12 to either one of the inlet flow path 14 and the atmospheric open flow path 30 by switching the upstream side switching unit 28 composed of a three-way solenoid valve. The operation of the upstream side switching unit 28 is controlled by the controller 26a.

Figure 5:
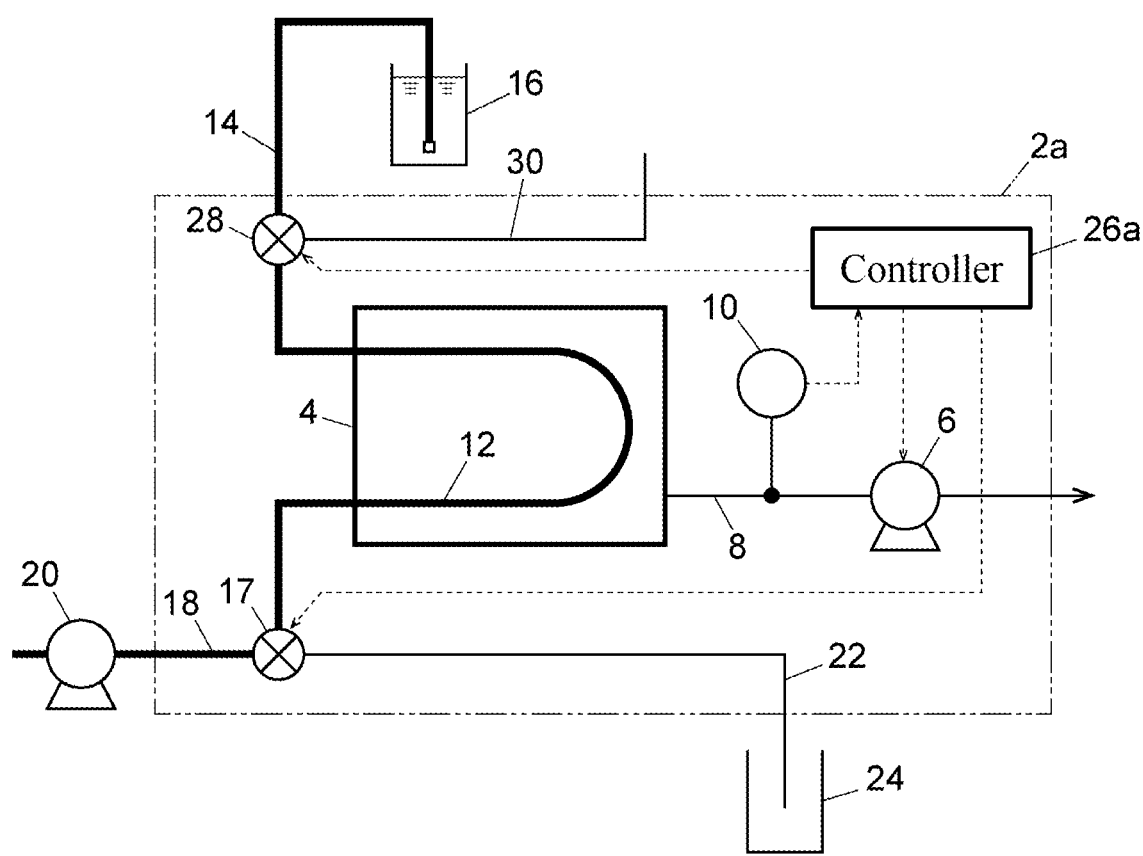
FIG. 5 is a flow path configuration diagram according to the embodiment in which a mobile phase liquid feeding path is indicated by a thick line.

At the time of the analysis by an HPLC, it is configured such that the controller 26a sets the downstream side switching unit 17 to a state in which the downstream end of the degassing flow path 12 and the outlet flow path 18 are connected and sets the upstream side switching unit 28 to a state in which the upstream end of the degassing flow path 12 and the inlet flow path 14 are connected. This causes the mobile phase in the mobile phase container 16 to flow through the degassing flow path 12 to the outlet flow path 18 as shown in FIG. 5.

Figure 6:
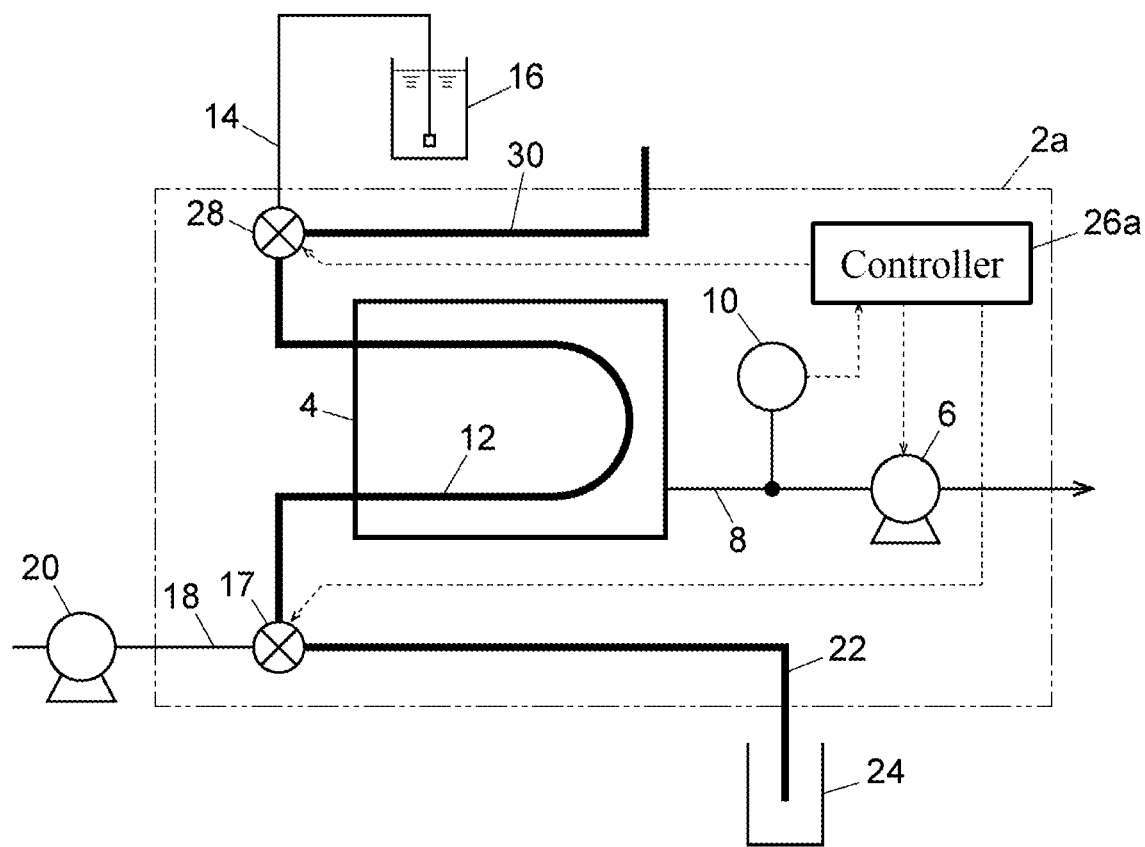
FIG. 6 is a flow path configuration diagram according to the embodiment in which the mobile phase discharging path is indicated by a thick line.

At a predetermined timing when feeding of the mobile phase by the liquid feeding pump 20 is stopped, for example, when a series of analysis operations is completed, the controller 26a is configured to set the downstream side switching unit 17 to a state in which the downstream end of the degassing flow path 12 and the drain flow path 22 are connected, and set the upstream side switching unit 28 to a state in which the upstream end of the degassing flow path 12 and the atmospheric open flow path 30 are connected. This causes only the mobile phase in the degassing flow path 12 to be drained through the drain flow path 22 to the waste liquid bottle 24 as shown in FIG. 6. Since the inlet flow path 14 leading to the mobile phase container 16 is disconnected from the degassing flow path 12 by connecting the upstream end of the degassing flow path 12 to the atmospheric open flow path 30, the mobile phase in the mobile phase container 16 can be retained even after completion of a series of analysis operations, so that the consumption of the mobile phase can be suppressed.

Figure 7:
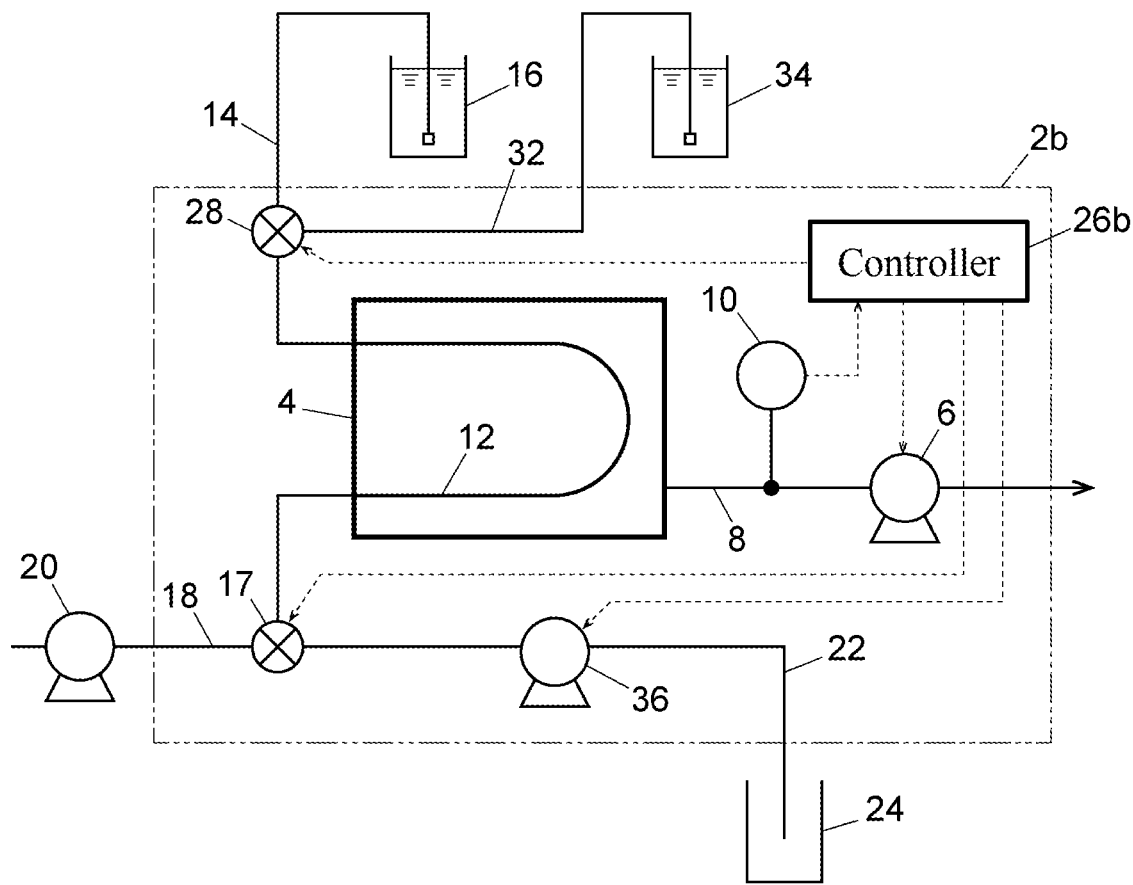
FIG. 7 is a flow path configuration diagram of the degassing device according to still another embodiment.

FIG. 7 shows still another embodiment of a degassing device.

Instead of the atmospheric open flow path 30 of the degassing device 2a of FIG. 4, the degassing device 2b of this embodiment is provided with a cleaning solution supply flow path 32 leading to a cleaning solution container 34 containing a cleaning solution (e.g. isopropyl alcohol), and a cleaning solution pump 36 is provided in the drain flow path 22. It is configured such that the upstream end of the degassing flow path 12 is selectively connected to one of the flow paths of the inlet flow path 14 and the cleaning solution supply flow path 32 by switching the upstream side switching unit 28. The operation of the upstream side switching unit 28 and that of the cleaning solution pump 36 are controlled by the controller 26b.

Figure 8:
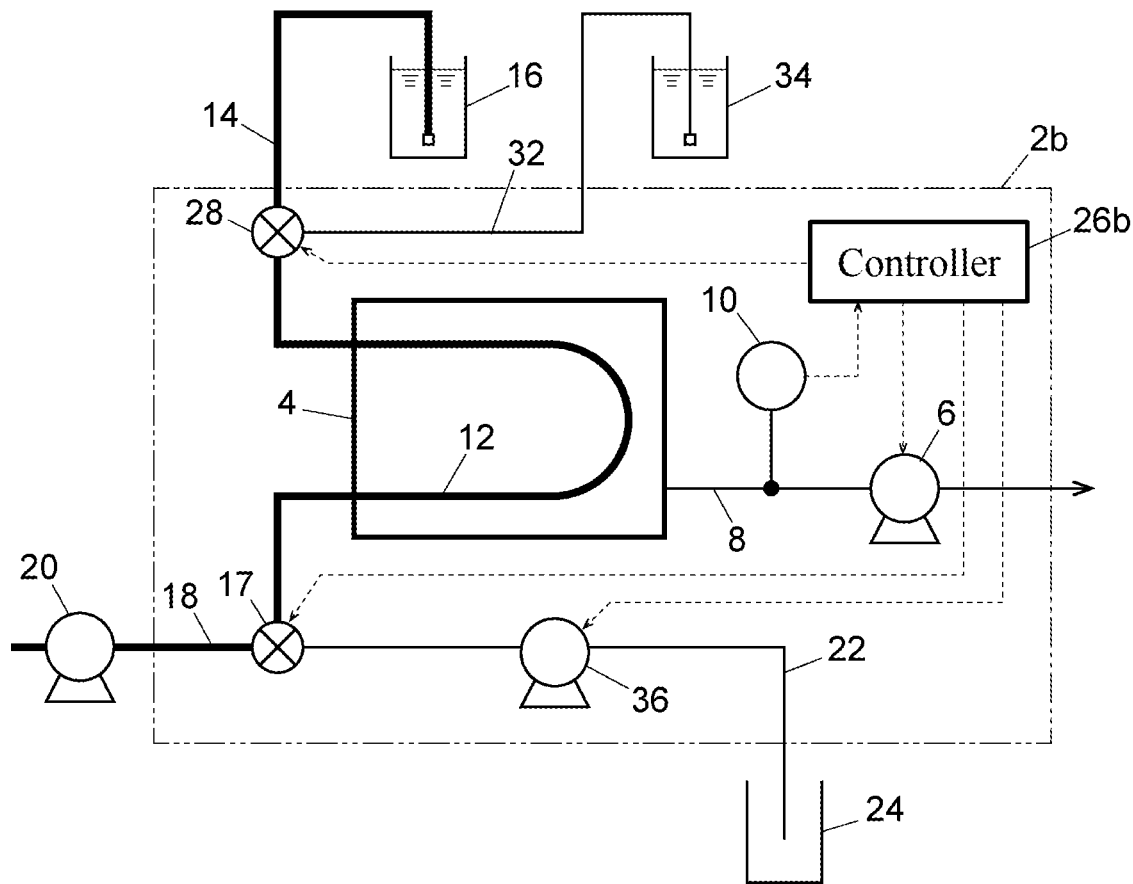
FIG. 8 is a flow path configuration diagram according to the embodiment in which the mobile phase liquid feeding path is indicated by a thick line.

At the time of the analysis by an HPLC, the controller 26b is configured to set the downstream side switching unit 17 to a state in which the downstream end of the degassing flow path 12 and the outlet flow path 18 are connected and set the upstream side switching unit 28 to a state in which the upstream end of the degassing flow path 12 and the inlet flow path 14 are connected. This causes the mobile phase of the mobile phase container 16 to flow through the degassing flow path 12 to the outlet flow path 1 as shown in FIG. 8.

Figure 9:
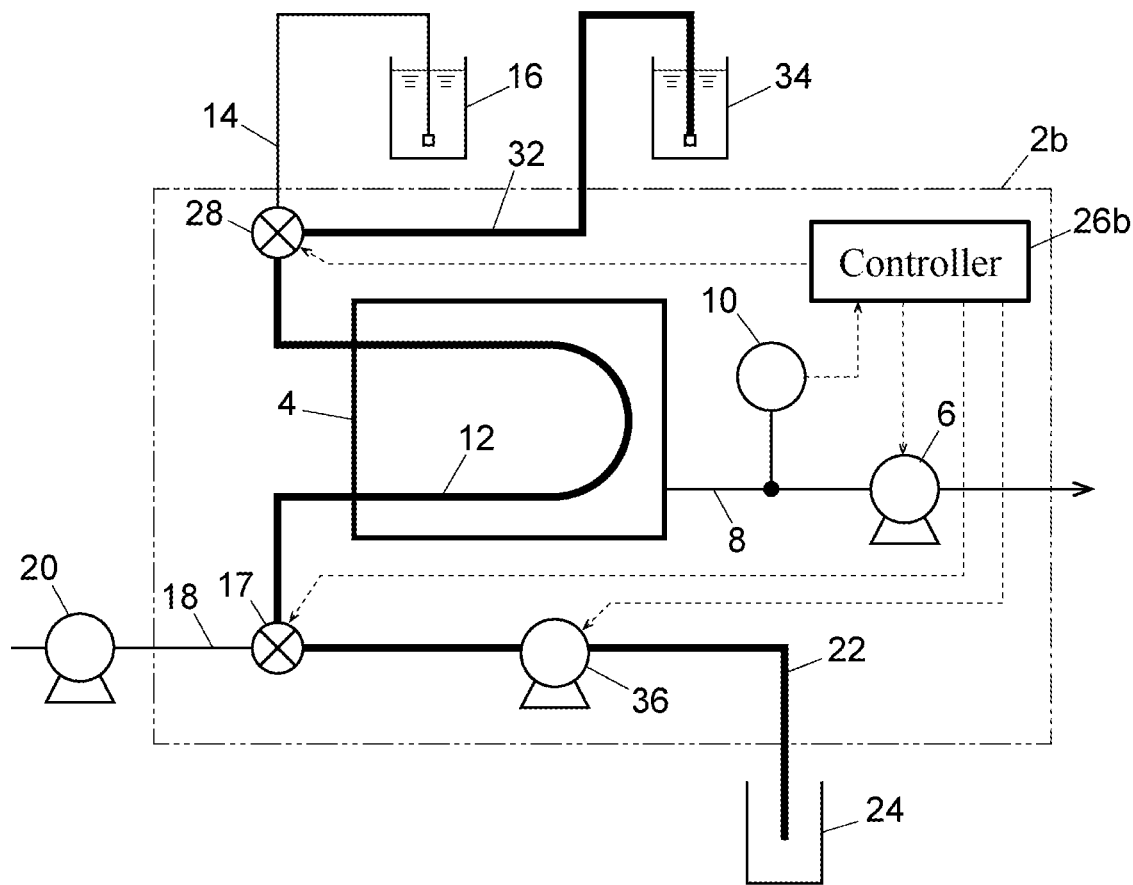
FIG. 9 is a flow path configuration diagram according to the embodiment in which the mobile phase discharging path is indicated by a thick line.

At the predetermined timing when feeding of the mobile phase by the liquid feeding pump 20 is stopped, for example, when a series of analysis operations is completed, it is configured such that the controller 26b sets the downstream side switching unit 17 to a state in which the downstream end of the degassing flow path 12 and the drain flow path 22 are connected, set the upstream side switching unit 28 to a state in which the upstream end of the degassing flow path 12 and the cleaning solution supply flow path 32 are connected, and operate the cleaning solution pump 36. With this, as shown in FIG. 9, the upstream end of the degassing flow path 12 is connected to the cleaning solution supply flow path 32, so that the cleaning solution is drained to the waste liquid bottle 24 through the degassing flow path 12 and the drain flow path 22. Since the inlet flow path 14 leading to the mobile phase container 16 is disconnected from the degassing flow path 12 by connecting the upstream end of the degassing flow path 12 to the cleaning solution supply flow path 32, the mobile phase in the mobile phase container 16 can be retained even after completion of a series of analysis operations, so that the consumption of the mobile phase can be suppressed. In addition, since the cleaning solution from the cleaning solution supply flow path 32 flows through the degassing flow path 12, the inside of the degassing flow path 12 can be cleaned at the same time.

Figure 10:
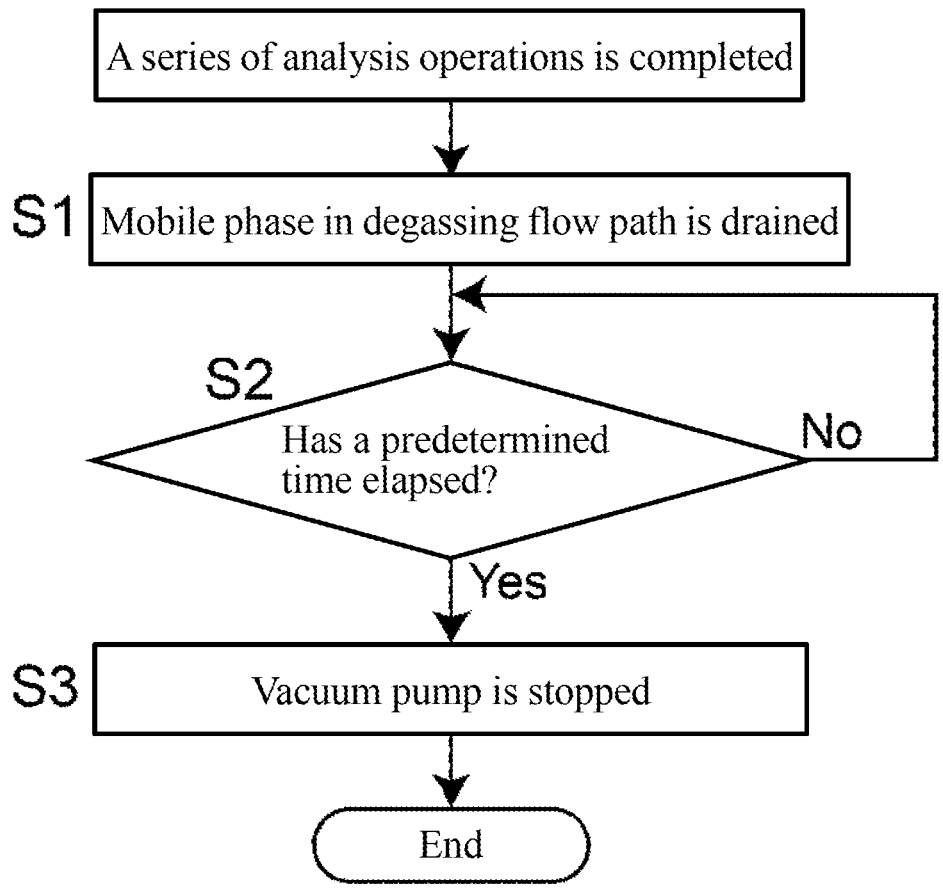
FIG. 10 is a flowchart showing an example of the maintenance operation after completion of a series of analysis operations.

An example of the maintenance operation after completion of a series of analytical operations by the degassing device 2, 2a, and 2b according to the embodiments described above will be described with reference to the flowchart of FIG. 10.

Upon completion of a series of analysis operations by an analysis device such as an HPLC, a signal indicating the completion is input to the controller 26, 26a, and 26b of the degassing device 2, 2a, and 2b. The controller 26, 26a, and 26b receives the signal and switches the downstream side switching unit 17 (and the upstream side switching unit 28) so that a flow path (a flow path indicated by a thick line in FIG. 3, FIG. 6, and FIG. 9) for discharging the mobile phase in the degassing flow path 12 is formed to drain the mobile phase in the degassing flow path 12 to the waste liquid bottle 24 (Step S1). At this time, the vacuum pump 6 may be in an operation state or in a stopped state.

After completion of draining the mobile phase in the degassing flow path 12, the vacuum pump 6 is operated for a predetermined period of time to discharge the gases in the vacuum chamber 4, the vacuum flow path 8, and the vacuum pump 6 to the outside (Step S2). Thereafter, the operation of the vacuum pump 6 is stopped to terminate the maintenance operation (Step S3).

Figure 11:
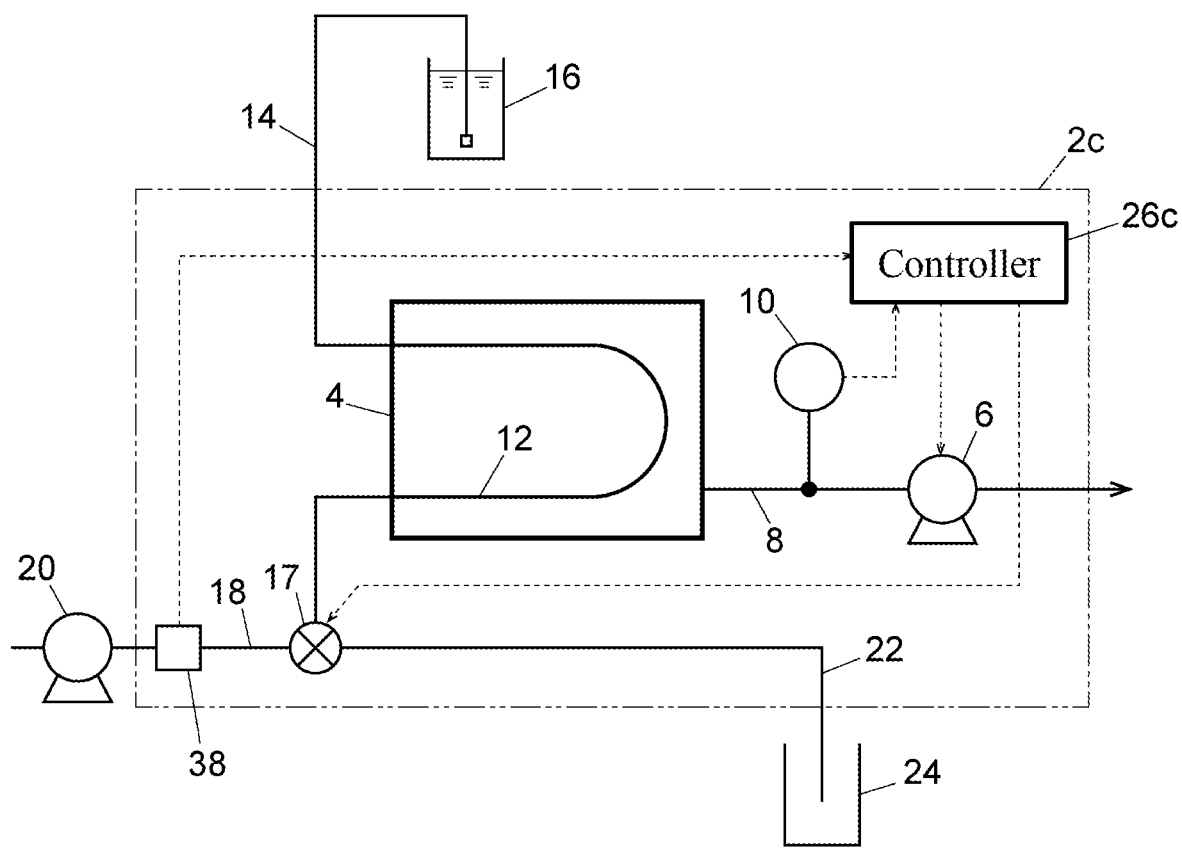
FIG. 11 is a flow path configuration diagram of a degassing device according to still yet another embodiment

FIG. 11 shows still yet another embodiment of a degassing device.

The degassing device 2c of the embodiment is provided with a flowmeter 38 on the outlet flow path 18 of the degassing device 2 of FIG. 1, and the controller 26c is configured to control the operation of the vacuum pump 6 based on a signal from the flowmeter 38. The controller 26c is configured to detect whether or not the liquid feeding pump 20 is in operation based on the signal from the flowmeter 38 and stop the operation of the vacuum pump 6 when a predetermined period of time has elapsed since the liquid feeding pump 20 has stopped.

In this embodiment, "the liquid feeding pump 20 has stopped" does not mean "a series of analysis operations has been completed" in the above-described embodiments, but it is assumed that the liquid feeding pump 20 stops for a predetermined period of time or longer between analyses although it is set to perform a plurality of analyses. Therefore, it is during a series of analysis operations that the operation of the vacuum pump 6 is stopped when a certain period of time has elapsed since the liquid feeding pump 20 is stopped, and it is not during the "maintenance operation" described above.

If the liquid feeding pump 20 stops during a series of analysis operations, the mobile phase will be retained in the degassing flow path 12. If the vacuum pump 6 is continuously operated in this condition, the vaporization of the mobile phase in the degassing flow path 12 will be promoted, the mobile phase will be vaporized and discharged to the outside, and the mobile phase will be wastefully consumed. In order to avoid such a situation, in this embodiment, the operation of the vacuum pump 6 is stopped when a predetermined period of time has elapsed since the stop of the liquid feeding pump 20.

Figure 12:
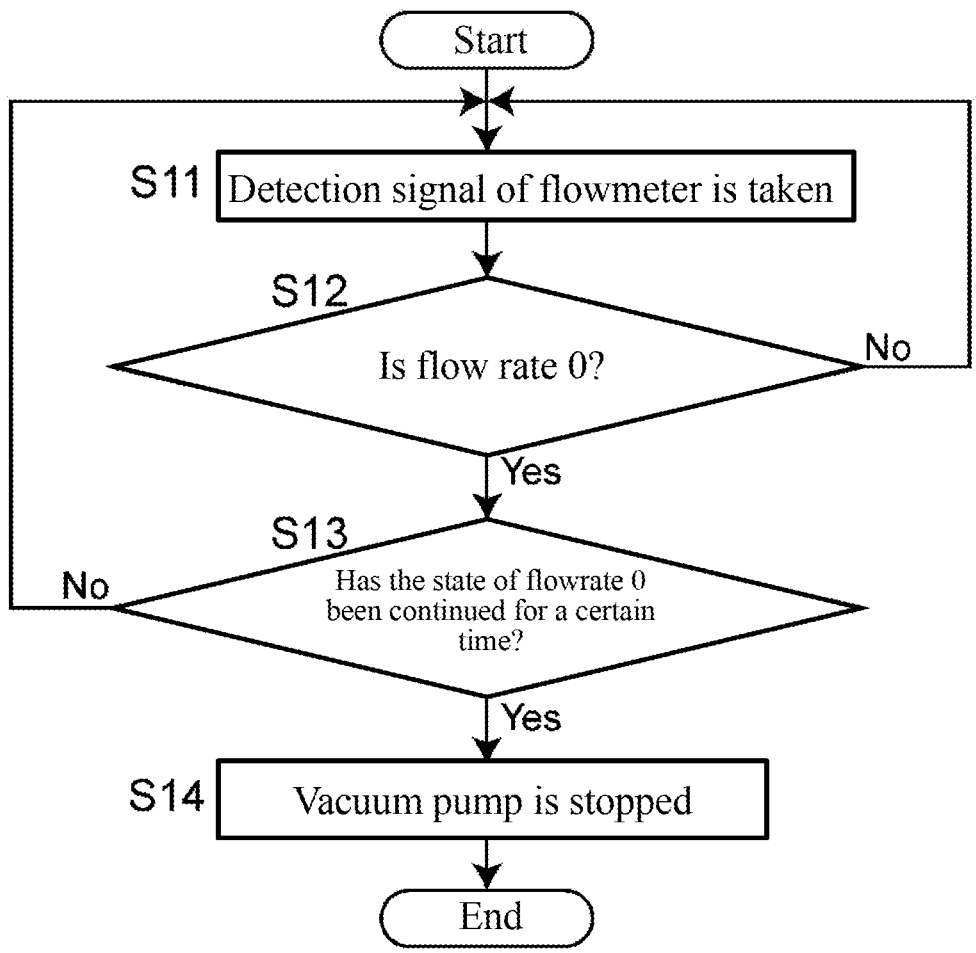
FIG. 12 is a flowchart illustrating an example of a vacuum pump according to the embodiment.

The control of the vacuum pump 6 of this embodiment will be described with reference to the flowchart of FIG. 12.

The controller 26c periodically captures the detected signal of the flowmeter 38 (Step S11), and determines each time whether or not the flow rate of the mobile phase in the outlet flow path 18 is 0 (Step S12). When the state in which the flow rate of the mobile phase in the outlet flow path 18 is 0 has been continued for a predetermined period of time (Step S13), the operation of the vacuum pump 6 is stopped (Step S14).

Note that the flowmeter 38 is not an essential constitutional component for detecting stopping of the liquid feeding pump 20. For example, the controller 26c may be configured to receive a signal from an HPLC system controller indicating that the operation of the liquid feeding pump 20 has stopped, or the controller 26c may be configured to receive a signal related to the operation status directly from the liquid feeding pump 20.

Further, although the degassing device 2c of FIG. 11 is based on the degassing device 2 of FIG. 1, the present invention is not limited to this. The degassing device 2a of FIG. 4 or the degassing device 2c of FIG. 7 may have a function of stopping the operation of the vacuum pump 6 when a predetermined period of time has elapsed since the stop of the liquid feeding pump 20.

DESCRIPTION OF REFERENCE SYMBOLS 2, 2a, 2b, 2c: degassing device
4: vacuum chamber
6: vacuum pump
8: vacuum flow path
10: pressure sensor
12: degassing flow path
14: inlet flow path
16: mobile phase container
17: downstream side switching unit
18: outlet flow path
20: liquid feeding pump
22: drain flow path
24: waste liquid bottle
26, 26a, 26b, 26c: controller
28: upstream side switching unit
30: atmospheric open flow path
32: cleaning solution supply flow path
34: cleaning solution container
36: cleaning solution pump
38: flowmeter

The invention claimed is:
1. A degassing device for degassing a mobile phase by being provided on an upstream side of a liquid feeding pump on a flow path of the mobile phase fed by the liquid feeding pump, the degassing device comprising:
   a degassing flow path made of a gas-permeable, liquid-impermeable tube;
   a vacuum chamber that accommodates the degassing flow path therein;
   a vacuum pump connected to the vacuum chamber to reduce pressure in the vacuum chamber;
   an inlet flow path configured to introduce the mobile phase to the degassing flow path;
   an outlet flow path provided between the liquid feeding pump and the degassing flow path, the outlet flow path being configured to cause the mobile phase that has passed through the degassing flow path to flow out by the liquid feeding pump;
   a drain flow path provided separately from the outlet flow path to drain the mobile phase in the degassing flow path from the degassing flow path without passing through the liquid feeding pump;

a downstream side switching unit configured to switch between a state in which a downstream end of the degassing flow path so as to beis connected to either the outlet flow path and a state in which the downstream end of the degassing flow path is connected to the drain flow path; and a controller configured to control an operation of the downstream side switching unit so that the downstream end of the degassing flow path is connected to the drain flow path at a predetermined timing when feeding of the mobile phase by the liquid feeding pump is stopped to drain the mobile phase in the degassing flow path through the drain flow path.

2. The degassing device as recited in claim 1, further comprising:

an atmospheric open flow path having an upstream end opened to the atmosphere; and an upstream side switching unit configured to switch an upstream end of the degassing flow path so as to be connected to either the inlet flow path or the atmospheric open flow path, wherein the controller is configured to control an operation of the downstream side switching unit and the upstream side switching unit to connect the upstream end of the degassing flow path to the inlet flow path in a case where the downstream end of the degassing flow path is connected to the outlet flow path and to connect the upstream end of the degassing flow path to the atmospheric open flow path in a case where the downstream end of the degassing flow path is connected to the drain flow path.

3. The degassing device as recited in claim 1, further comprising:

a cleaning solution supply flow path configured to supply a cleaning solution to the degassing flow path; and an upstream side switching unit configured to switch an upstream end of the degassing flow path so as to be connected to either the inlet flow path or the cleaning solution supply flow path, wherein the controller is configured to control an operation of the downstream side switching unit and an operation of the upstream side switching unit to connect the upstream end of the degassing flow path to the inlet flow path in a case where the downstream end of the degassing flow path is connected to the outlet flow path and to connect the upstream end of the degassing flow path to the cleaning solution supply flow path in a case where the downstream end of the degassing flow path is connected to the drain flow path.

4. The degassing device as recited in claim 1, wherein the controller is configured to also control an operation of the vacuum pump to operate the vacuum pump for a predetermined period of time after the mobile phase in the degassing flow path has been drained through the drain flow path.

5. The degassing device as recited in claim 1, wherein the controller is configured to also control an operation of the vacuum pump to stop the operation of the vacuum pump in a case where the feeding of the mobile phase by the liquid feeding pump is in a stopped state.

6. The degassing device as recited in claim 5, further comprising:

a flow sensor configured to detect a flow rate of the mobile phase flowing through the outlet flow path, wherein the controller is configured to deactivate the operation of the vacuum pump in a case where the flow rate of the mobile phase detected by the flow sensor is zero.

* * * * *